(12) United States Patent
Harada (10) Patent No.: US 8,386,154 B2
(45) Date of Patent: Feb. 26, 2013

(54) INTERNAL COMBUSTION ENGINE SYSTEM, VEHICLE HAVING INTERNAL COMBUSTION ENGINE SYSTEM, AND CONTROL METHOD OF INTERNAL COMBUSTION ENGINE SYSTEM

(75) Inventor: Takeshi Harada, Nagoya (JP)

(73) Assignees: Toyota Jidosha Kabushiki Kaisha, Toyota-Shi (JP); Denso Corporation, Kariya-Shi (JP)

( * ) Notice: Subject to any disclaimer, the term of this patent is extended or adjusted under 35 U.S.C. 154(b) by 566 days.

(21) Appl. No.: 12/676,854

(22) PCT Filed: Jul. 2, 2008

(86) PCT No.: PCT/JP2008/061960
§ 371 (c)(1),
(2), (4) Date: Mar. 5, 2010

(87) PCT Pub. No.: WO2009/031356
PCT Pub. Date: Mar. 12, 2009

(65) Prior Publication Data
US 2010/0256895 A1 Oct. 7, 2010

(30) Foreign Application Priority Data
Sep. 7, 2007 (JP) ................................ 2007-232270

(51) Int. Cl.
B60T 7/12 (2006.01)
G05D 1/00 (2006.01)
G06F 7/00 (2006.01)
G06F 17/00 (2006.01)
F02D 41/00 (2006.01)
B60W 10/06 (2006.01)
B60W 20/00 (2006.01)

(52) U.S. Cl. ..................... 701/108; 123/686; 180/65.28; 903/906

(58) Field of Classification Search ............. 123/568.21, 123/568.26, 435, 679, 686, 687, 689; 180/65.28; 701/102, 103, 108, 110; 903/905
See application file for complete search history.

(56) References Cited

U.S. PATENT DOCUMENTS

| 7,934,371 B2 * | 5/2011 | Sugimoto | 60/285 |
| 2006/0144374 A1 * | 7/2006 | Nishimura et al. | 123/568.16 |
| 2008/0256929 A1 * | 10/2008 | Sugimoto | 60/278 |
| 2010/0256895 A1 * | 10/2010 | Harada | 701/108 |

FOREIGN PATENT DOCUMENTS

| EP | 2187025 A1 * | 5/2010 |
| JP | 8-98319 | 4/1996 |
| JP | 10-89157 A | 4/1998 |
| JP | 2002-48011 A | 2/2002 |

(Continued)

Primary Examiner — Stephen K Cronin
Assistant Examiner — Sherman Manley
(74) Attorney, Agent, or Firm — Kenyon & Kenyon LLP (57) ABSTRACT

The execution operation curve is set by switching from the EGR-off time operation curve to the EGR-on time operation curve when the EGR is started with the cooling water temperature being more than or equal to the first temperature, the execution operation curve is set by switching from the EGR-on time operation curve to the EGR-off time operation curve f when the cooling water temperature becomes smaller than the second temperature that is lower than the first temperature, and controls the engine. Accordingly, frequent changes of the execution operation curve are restricted. As a result, the operation state of the engine with the EGR performed as necessary is effectively prevented from becoming unstable further.

6 Claims, 6 Drawing Sheets

FOREIGN PATENT DOCUMENTS

| | | |
|---|---|---|
| JP | 2002-227692 A | 8/2002 |
| JP | 2003-116203 A | 4/2003 |
| JP | 2004-360672 A | 12/2004 |
| JP | 2005-214126 A | 8/2005 |
| JP | 2006-177247 A | 7/2006 |
| JP | 2007-211594 A | 8/2007 |

* cited by examiner

Fig. 8

US 8,386,154 B2

INTERNAL COMBUSTION ENGINE SYSTEM, VEHICLE HAVING INTERNAL COMBUSTION ENGINE SYSTEM, AND CONTROL METHOD OF INTERNAL COMBUSTION ENGINE SYSTEM

This is a 371 national phase application of PCT/JP2008/061960 filed 2 Jul. 2008, claiming priority to Japanese Patent Application No. JP 2007-232270 filed 7 Sep. 2007, the contents of which are incorporated herein by reference.

TECHNICAL FIELD

The present invention relates to an internal combustion engine system, a vehicle having the internal combustion engine system, and a control method of the internal combustion engine system.

BACKGROUND ART

One proposed internal combustion engine system, having an engine and an EGR device that performs an exhaust gas recirculation (EGR) where exhaust from the engine is supplied to an intake system of the engine, sets one curve as an execution operation curve among several operation curves defining a relation between a rotation speed and a torque of the engine, and controls the engine based on the set execution operation curve and a power demand required for the engine (see, for example, Patent Document 1). In this internal combustion engine system, the engine is controlled based on the power demand required for the engine with the execution operation curve set to be, for example, a fuel economy prioritized operation curve for operating the engine without performing the EGR, and a high EGR operation curve and a low EGR operation curve for outputting a smaller torque from the engine with the EGR performed than the torque in the fuel economy prioritized operation curve.

Patent Document 1: Japanese Patent Laid-Open No. 2004-360672

DISCLOSURE OF THE INVENTION

In the proposed internal combustion engine system and the other internal combustion engine system where an operation curve of an engine is switched according to on and off state of the EGR, when the EGR is switched on and off at frequent intervals, an amount of the exhaust supplied to the intake system of the engine is frequently changed and there is a case where an operation state of the engine becomes unstable. In this case, the operation curve of the engine is also changed according to the on and off state of the EGR and there is a case where the operation state of the engine becomes unstable further due to change of the rotation speed of the engine.

In the internal combustion engine system, the vehicle having the internal combustion engine system, and the control method of the internal combustion engine system of the invention, the main object of the invention is to prevent the operation state of the internal combustion engine with the exhaust gas recirculation performed as necessary from becoming unstable further.

In order to attain the main object, the internal combustion engine system, the vehicle having the internal combustion engine system, and the control method of the internal combustion engine system of the invention have the configurations discussed below.

According to one aspect, the present invention is directed to an internal combustion engine system. The internal combustion engine system, having an internal combustion engine, has: an exhaust gas recirculation unit that performs an exhaust gas recirculation where exhaust from the internal combustion engine is recirculated to an intake system of the internal combustion engine; a temperature detector that detects a temperature of cooling water of the internal combustion engine; a target power setting module that sets a target power to be output from the internal combustion engine; an execution relation setting module that, when the exhaust gas recirculation is started by the exhaust gas recirculation unit with the detected temperature of the cooling water being more than or equal to a first temperature while a first relation between a rotation speed and a torque of the internal combustion engine is set as an execution relation, sets a second relation having a smaller torque than the torque of the internal combustion engine in the first relation as the execution relation, and when the detected temperature of the cooling water becomes smaller than a second temperature that is lower than the first temperature while the second relation is set as the execution relation, the execution relation setting module setting the first relation as the execution relation; and a control module that controls the internal combustion engine and the exhaust gas recirculation unit so that the set target power is output from the internal combustion engine according to the set execution relation with the exhaust gas recirculation performed as necessary.

The internal combustion engine system according to this aspect of the invention, when the exhaust gas recirculation is started by the exhaust gas recirculation unit with a temperature of cooling water of the internal combustion engine being more than or equal to a first temperature while a first relation between a rotation speed and a torque of the internal combustion engine is set as an execution relation, sets a second relation having a smaller torque than the torque of the internal combustion engine in the first relation as the execution relation, and when the temperature of the cooling water becomes smaller than a second temperature that is lower than the first temperature while the second relation is set as the execution relation, the system setting the first relation as the execution relation. The system controls the internal combustion engine and the exhaust gas recirculation unit so that a target power to be output from the internal combustion engine is output from the internal combustion engine according to the set execution relation and the exhaust gas recirculation is performed by the exhaust gas recirculation unit as necessary. Accordingly, the execution relation is not changed without at least a change in the temperature of the cooling water of the internal combustion engine and frequent changes of the execution relation is restricted. As a result, this arrangement effectively prevents the operation state of the internal combustion engine with the exhaust gas recirculation performed as necessary from becoming unstable further. In this internal combustion engine system of the invention, the 'first relation' includes a relation of the rotation speed and the torque of the internal combustion engine that is efficiently operated when the exhaust gas recirculation is not performed by the exhaust gas recirculation unit and the 'second relation' includes a relation of the rotation speed and the torque of the internal combustion engine that is efficiently operated when the exhaust gas recirculation is performed by the exhaust gas recirculation unit.

In one preferable application of the internal combustion engine system of the invention, the control module may control the exhaust gas recirculation unit so that the exhaust gas recirculation is performed upon satisfaction of an exhaust gas recirculation condition that includes a condition that the detected temperature of the cooling water is more than or equal to the first temperature. This arrangement sets the second relation having a smaller torque than the torque in the first relation as the execution relation upon satisfaction of the exhaust gas recirculation condition and thus enables the operation state of the internal combustion engine with the exhaust gas recirculation performed to be more appropriate.

According to another aspect, the present invention is directed to a vehicle having any of the above arrangements of the internal combustion engine system and the target power setting module sets the target power based on a driving power demand for driving the vehicle. Here the internal combustion engine system, having an internal combustion engine, fundamentally has: an exhaust gas recirculation unit that performs an exhaust gas recirculation where exhaust from the internal combustion engine is recirculated to an intake system of the internal combustion engine; a temperature detector that detects a temperature of cooling water of the internal combustion engine; a target power setting module that sets a target power to be output from the internal combustion engine; an execution relation setting module that, when the exhaust gas recirculation is started by the exhaust gas recirculation unit with the detected temperature of the cooling water being more than or equal to a first temperature while a first relation between a rotation speed and a torque of the internal combustion engine is set as an execution relation, sets a second relation having a smaller torque than the torque of the internal combustion engine in the first relation as the execution relation, and when the detected temperature of the cooling water becomes smaller than a second temperature that is lower than the first temperature while the second relation is set as the execution relation, the execution relation setting module setting the first relation as the execution relation; and a control module that controls the internal combustion engine and the exhaust gas recirculation unit so that the set target power is output from the internal combustion engine according to the set execution relation with the exhaust gas recirculation performed as necessary.

The vehicle according to this aspect of the invention has any of the above arrangements of the internal combustion engine system described above. The vehicle thus has at least part of effects such as an effect of preventing the operation state of the internal combustion engine with the exhaust gas recirculation performed as necessary from becoming unstable further and an effect of enabling the operation state of the internal combustion engine with the exhaust gas recirculation performed to be more appropriate.

In one preferable application of the vehicle of the invention, the vehicle may further has: a motor capable of outputting power to a driveshaft linked to an axle of the vehicle; an electric power-mechanical power input output assembly connected with the driveshaft and with an output shaft of the internal combustion engine in such a manner as to be rotatable independently of the driveshaft and configured to input and output power to and from the driveshaft and the output shaft through input and output of electric power and mechanical power; and an accumulator configured to transmit electric power to and from the motor and the electric power-mechanical power input output assembly.

According to still another aspect, the present invention is directed to a control method of an internal combustion engine system having an internal combustion engine and an exhaust gas recirculation unit that performs an exhaust gas recirculation where exhaust from the internal combustion engine is recirculated to an intake system of the internal combustion engine. The control method includes: when the exhaust gas recirculation is started by the exhaust gas recirculation unit with a temperature of cooling water of the internal combustion engine being more than or equal to a first temperature while a first relation between a rotation speed and a torque of the internal combustion engine is set as an execution relation, setting a second relation having a smaller torque than the torque of the internal combustion engine in the first relation as the execution relation, and when the temperature of the cooling water becomes smaller than a second temperature that is lower than the first temperature while the second relation is set as the execution relation, the control method setting the first relation as the execution relation; and controlling the internal combustion engine and the exhaust gas recirculation unit so that a target power to be output from the internal combustion engine is output from the internal combustion engine according to the set execution relation and the exhaust gas recirculation performed as necessary.

The control method of the internal combustion engine system according to this aspect of the invention, when the exhaust gas recirculation is started by the exhaust gas recirculation unit with a temperature of cooling water of the internal combustion engine being more than or equal to a first temperature while a first relation between a rotation speed and a torque of the internal combustion engine is set as an execution relation, sets a second relation having a smaller torque than the torque of the internal combustion engine in the first relation as the execution relation, and when the temperature of the cooling water becomes smaller than a second temperature that is lower than the first temperature while the second relation is set as the execution relation, the control method setting the first relation as the execution relation. The control method controls the internal combustion engine and the exhaust gas recirculation unit so that a target power to be output from the internal combustion engine is output from the internal combustion engine according to the set execution relation and the exhaust gas recirculation is performed by the exhaust gas recirculation unit as necessary. Accordingly, the execution relation is not changed without at least a change in the temperature of the cooling water of the internal combustion engine and frequent changes of the execution relation are restricted. As a result, this arrangement effectively prevents the operation state of the internal combustion engine with the exhaust gas recirculation performed as necessary from becoming unstable further. In this internal combustion engine system of the invention, the 'first relation' includes a relation of the rotation speed and the torque of the internal combustion engine that is efficiently operated when the exhaust gas recirculation is not performed by the exhaust gas recirculation unit and the 'second relation' includes a relation of the rotation speed and the torque of the internal combustion engine that is efficiently operated when the exhaust gas recirculation is performed by the exhaust gas recirculation unit.

In one preferable application of the control method of the internal combustion engine system of the invention, the control method may control the exhaust gas recirculation unit so that the exhaust gas recirculation is performed upon satisfaction of an exhaust gas recirculation condition that includes a condition that the temperature of the cooling water is more than or equal to the first temperature. This arrangement sets the second relation having a smaller torque than the torque in the first relation as the execution relation upon satisfaction of the exhaust gas recirculation condition and thus enables the operation state of the internal combustion engine with the exhaust gas recirculation performed to be more appropriate.

BEST MODES OF CARRYING OUT THE INVENTION

Figure 1:
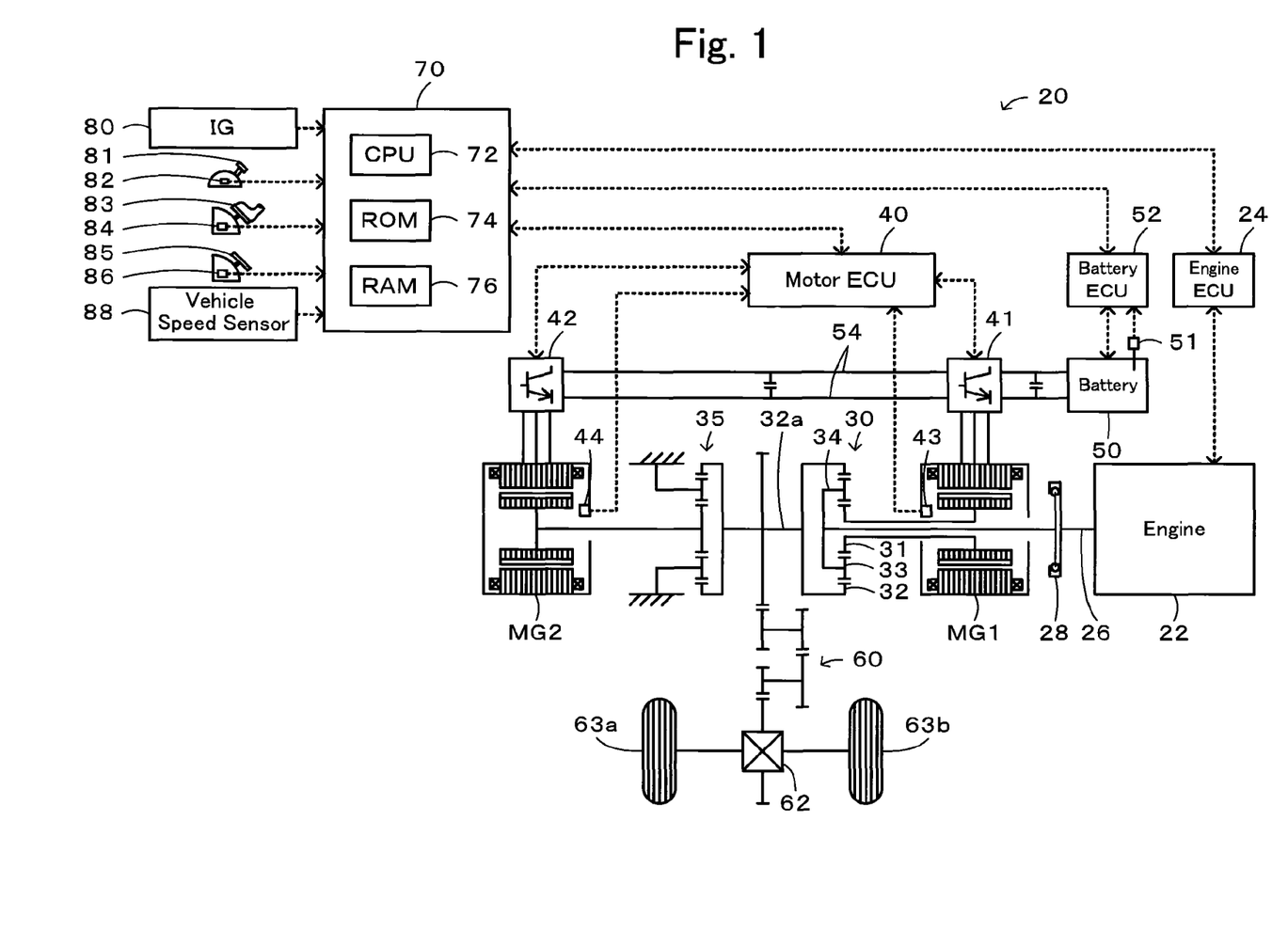
FIG. 1 schematically illustrates the configuration of a hybrid vehicle 20 having an internal combustion engine system in one embodiment of the invention.

One mode of carrying out the invention is discussed below as a preferred embodiment. FIG. 1 schematically illustrates the configuration of a hybrid vehicle 20 having an internal combustion engine system in one embodiment according to the invention. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, and a hybrid electronic control unit 70 configured to control the operations of the whole hybrid vehicle 20. The internal combustion engine system of the embodiment corresponds primarily to the engine 22, an engine electronic control unit 24 controlling the engine 22, and the hybrid electronic control unit 70.

Figure 2:
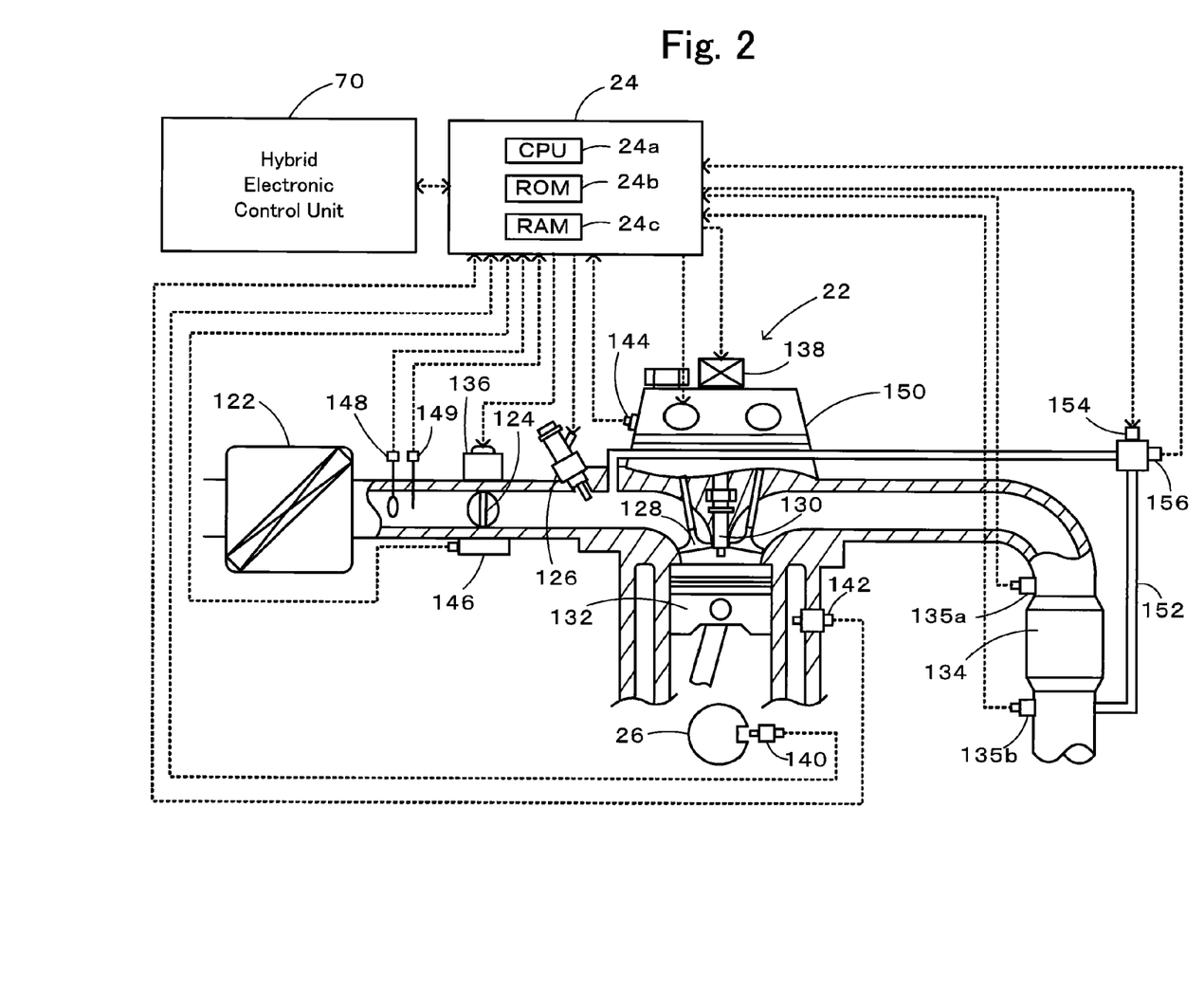
FIG. 2 is a schematic view showing the structure of an engine 22.

The engine 22 is an internal combustion engine that consumes a hydrocarbon fuel, such as gasoline or light oil, to output power. As shown in FIG. 2, the air cleaned by an air cleaner 122 and taken into an air intake conduit via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter (three-way catalyst) 134 to convert toxic components included in the exhaust, that is, carbon monoxide (CO), hydrocarbons (HC), and nitrogen oxides (NOx), into harmless components, and is discharged to the outside air. An EGR pipe 152 is provided downstream of the catalytic converter 134 to recirculate the flow of the exhaust to the air intake system. In the structure of the engine 22, the uncombusted gas discharged as the exhaust is flowed into the air intake system to be mixed with the intake air and is further mixed with the atomized fuel to the air-fuel mixture, which is introduced into the combustion chamber.

The engine 22 is under control of an engine electronic control unit (hereafter referred to as engine ECU) 24. The engine ECU 24 is constructed as a microprocessor including a CPU 24a, a ROM 24b configured to store processing programs, a RAM 24c configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 140 detected as the rotational position of the crankshaft 26, a cooling water temperature Tw from a water temperature sensor 142 measured as the temperature of cooling water in the engine 22, cam positions from a cam position sensor 144 detected as the rotational positions of camshafts driven to open and close the intake valve 128 and an exhaust valve for gas intake and exhaust into and from the combustion chamber, a throttle position from a throttle valve position sensor 146 detected as the position of the throttle valve 124, an intake air amount Qa from an air flow meter 148 located in an air intake conduit, an intake air temperature from a temperature sensor 149 located in the air intake conduit, an air fuel ratio from an air-fuel ratio sensor 135a, an oxygen signal from an oxygen sensor 135b, and an EGR gas temperature from a temperature sensor 156 measured as the temperature of EGR gas in the EGR pipe 152. The engine ECU 24 outputs, via its output port, diverse control signals and driving signals to drive and control the engine 22. The signals output from the engine ECU 24 include driving signals to the fuel injection valve 126, driving signals to a throttle valve motor 136 driven to regulate the position of the throttle valve 124, control signals to an ignition coil 138 integrated with an igniter, control signals to a variable valve timing mechanism 150 to vary the open and close timings of the intake valve 128, and driving signals to an EGR valve 154 driven to regulate the recirculated amount of the exhaust to the air intake system. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements. The engine ECU 24 also performs several arithmetic operations to compute a rotation speed of the crankshaft 26 or a rotation speed Ne of the engine 22 from the crank position input from the crank position sensor 140.

The power distribution integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 also performs various arithmetic operations for management and control of the battery 50. A remaining charge or state of charge (SOC) of the battery 50 is calculated from an integrated value of the charge-discharge current measured by the current sensor.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
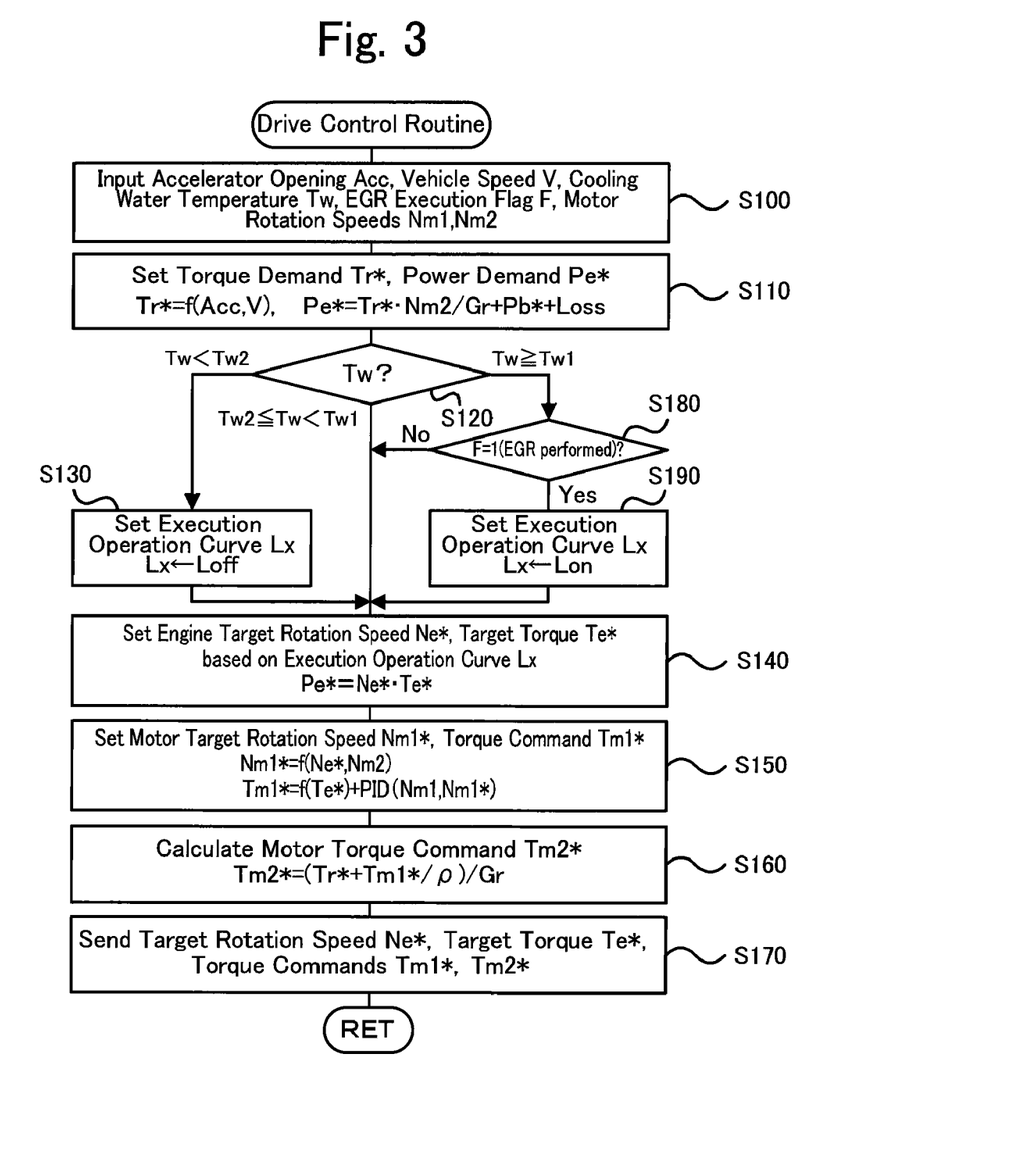
FIG. 3 is a flowchart showing a drive control routine executed by a hybrid electronic control unit 70 in the embodiment.

The description regards the operations of the hybrid vehicle 20 of the embodiment having the configuration discussed above, especially a series of operation control while driving the hybrid vehicle 20 with operation of the engine 22. FIG. 3 is a flowchart showing a drive control routine executed by the hybrid electronic control unit 70. This routine is performed repeatedly at preset time intervals (for example, at every several msec).

In the drive control routine, the CPU 72 of the hybrid electronic control unit 70 inputs various data required for drive control, for example, the accelerator opening Acc from the accelerator pedal position sensor 84, the vehicle speed V from the vehicle speed sensor 88, the cooling water temperature Tw of the engine 22, an EGR execution flag F, and the rotation speeds Nm1 and Nm2 of the motors MG1 and MG2 (step S100). The cooling water temperature Tw is measured by the water temperature sensor 142 and input from the engine ECU 24 by communication. The EGR execution flag F is set to be value '0' while the exhaust gas recirculation (EGR) where the exhaust from the engine 22 is recirculated to the air intake system is not performed and is set to be value '1' while the EGR is performed, and is input from the engine ECU 24 by communication. In the embodiment, the EGR execution flag F is set to be value '1' and the EGR is performed under the control of the engine ECU 24 when the cooling water temperature Tw of the engine 22 is more than or equal to a first temperature Tw1 (for example, 65° C. or 70° C.) that indicates completion of warm-up of the engine 22 while satisfying an EGR execution condition that the rotation speed Ne and the intake air amount Qa are within a preset range where performing the EGR is allowed. The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication.

Figure 4:
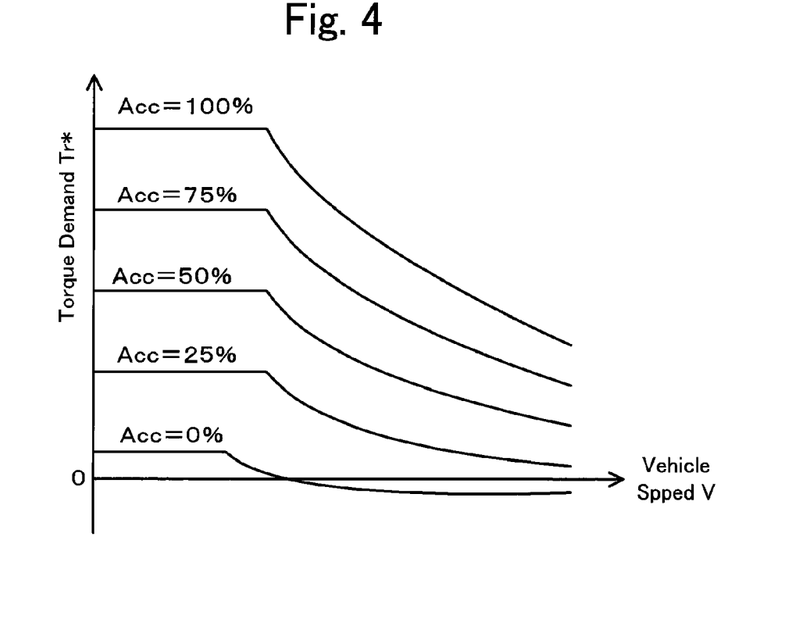
FIG. 4 shows one example of the torque demand setting map.

After the data input, the CPU 72 sets a torque demand Tr* to be output to the ring gear shaft 32a or the driveshaft linked with the drive wheels 63a and 63b as a torque required for the hybrid vehicle 20 based on the input accelerator opening Acc and the input vehicle speed V and sets a power demand Pe* required for the engine 22 (step S110). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 4. The power demand Pe* is calculated as the sum of the product of the set torque demand Tr* and a rotation speed Nr of the ring gear shaft 32a, the charge-discharge power demand Pb* to be charged into or discharged from the battery 50, and a potential loss. The rotation speed Nr of the ring gear shaft 32a is obtained by multiplying the vehicle speed V by a preset conversion factor k (Nr=k·V) or by dividing the rotation speed Nm2 of the motor MG2 by a gear ratio Gr of the reduction gear 35 (Nr=Nm2/Gr).

Figure 5:
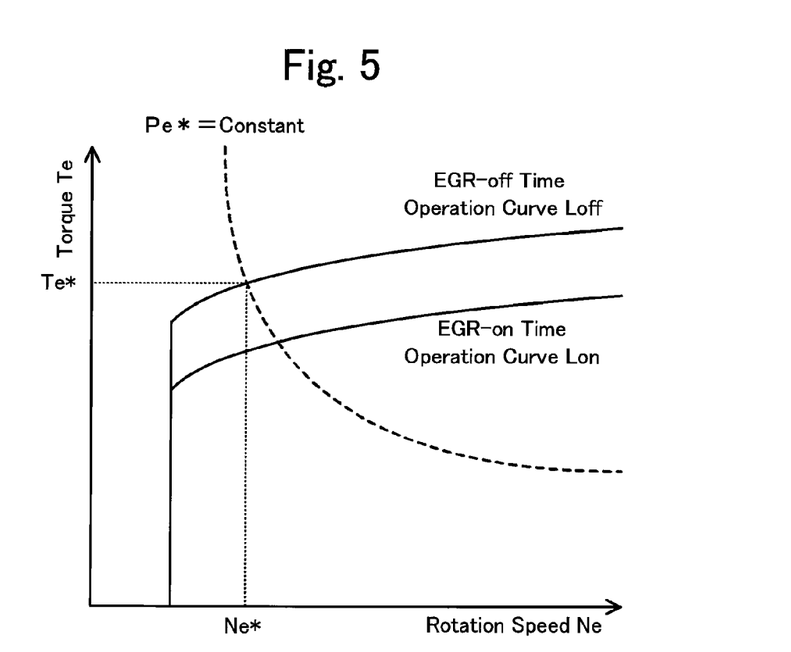
FIG. 5 shows an EGR-off time operation curve Loff and an EGR-on time operation curve Lon of the engine 22 and usage of the EGR-off time operation curve Loff as an execution operation curve to set the target rotation speed Ne* and the target torque Te*.

The CPU 72 then compares the input cooling water temperature Tw of the engine 22 with the first temperature Tw1 above described and with a second temperature Tw2 (for example, 50° C., 55° C. or 60° C.) that is lower than the first temperature Tw1 (step S120). When the cooling water temperature Tw is less than the second temperature Tw2, the CPU 72 sets an EGR-off time operation curve Loff to an execution operation curve Lx of the engine 22 (step S130) and sets a target rotation speed Ne* and a target torque Te* defining a target drive point of the engine 22 based on the set execution operation curve Lx and the power demand Pe* of the engine 22 (step S140). The EGR-off time operation curve Loff is determined to ensure efficient operation of the engine 22 when the EGR is not performed. FIG. 5 shows an EGR-off time operation curve of the engine 22 and usage of the EGR-off time operation curve as the execution operation curve to set the target rotation speed Ne* and the target torque Te*. As clearly shown in FIG. 5, the target rotation speed Ne* and the target torque Te* are given as an intersection of the operation curve and a curve of constant power demand Pe* (Ne*×Te*). FIG. 5 also shows, for the purpose of comparison, an EGR-on time operation curve Lon determined to ensure efficient operation of the engine 22 when the EGR is performed. The torque in the EGR-on time operation curve Lon is determined to be smaller than the torque in the EGR-off time operation curve Loff as clearly shown in FIG. 5. This is because there is a tendency that the combustion temperature is lowered and the output torque is lowered when the exhaust including large amount of carbon dioxide having large heat capacity is recirculated to the air intake system. The reason why the cooling water temperature Tw is compared with the first temperature Tw1 is to determine dissatisfaction of the EGR execution condition using the cooling water temperature Tw before anything else. The reason why the cooling water temperature Tw is compared with the second temperature Tw2 is to be described later.

Figure 6:
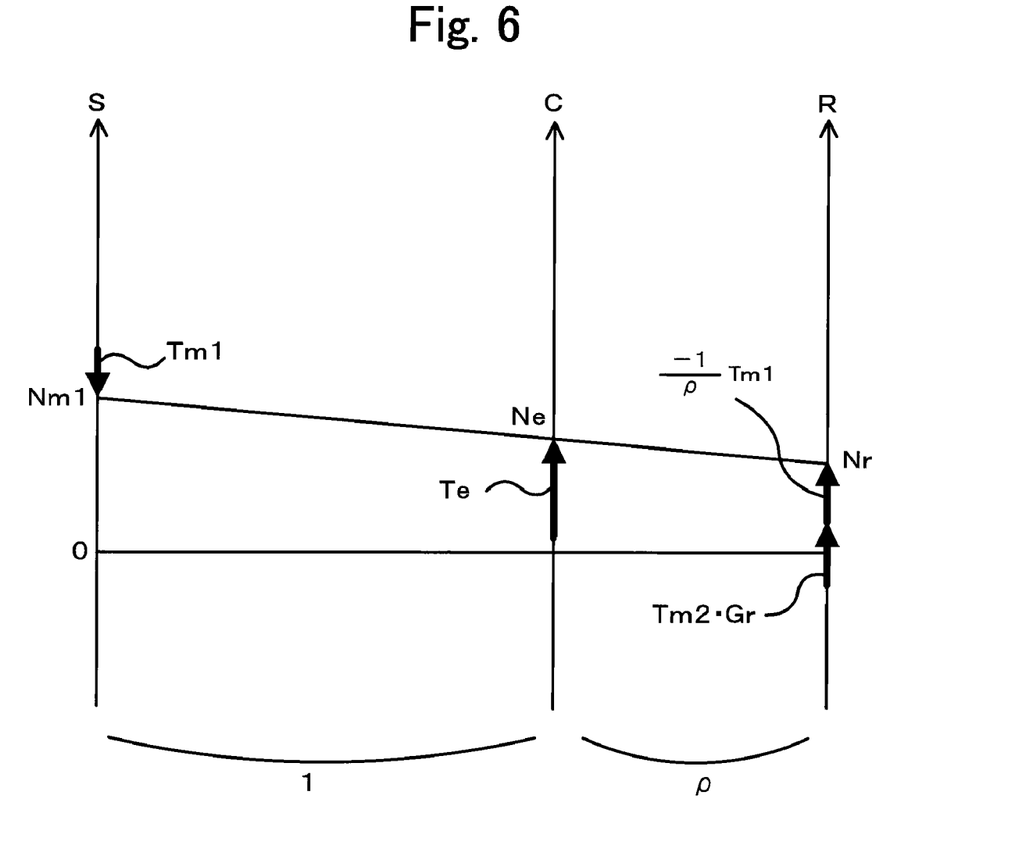
FIG. 6 is an alignment chart showing torque-rotation speed dynamics of the respective rotational elements included in the power distribution integration mechanism 30 during the drive of the hybrid vehicle 20 with output power from the engine 22.

The CPU 72 then calculates a target rotation speed Nm1* of the motor MG1 from the target rotation speed Ne* of the engine 22, the rotation speed Nr (Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S150), and the CPU 72 calculates a torque command Tm2* of the motor MG2 from the torque demand Tr*, the torque command Tm1* of the motor MG1, the gear ratio ρ of the power distribution integration mechanism 30, and the gear ratio Gr of the reduction gear 35 according to Equation (3) given below (step S160). Equation (1) is a dynamic relational expression of respective rotational elements included in the power distribution integration mechanism 30. FIG. 6 is an alignment chart showing torque-rotation speed dynamics of the respective rotational elements included in the power distribution integration mechanism 30. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (1) and (3) are readily introduced from this alignment chart. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

$$Nm1^* = Ne^* \cdot (1+\rho)/\rho - Nm2/(Gr \cdot \rho) \qquad (1)$$

$$Tm1^* = \rho \cdot Te^*/(1+\rho) + k1(Nm1^* - Nm1) + k2\int(Nm1^* - Nm1)dt \qquad (2)$$

$$Tm2^* = (Tr^* + Tm1^*/\rho)/Gr \qquad (3)$$

After setting the target rotation speed Ne* and the target torque Te* of the engine 22 and the torque commands Tm1* and Tm2* of the motors MG1 and MG2, the CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S170) and terminates the drive control routine. In response to reception of the settings of the target rotation speed Ne* and the target torque Te*, the engine ECU 24 performs required controls including intake air flow regulation, ignition control, and fuel injection control of the engine 22 to drive the engine 22 at the specific drive point defined by the combination of the target rotation speed Ne* and the target torque Te*. In response to reception of the settings of the torque commands Tm1* and Tm2*, the motor ECU 40 performs switching control of the switching elements in the inverter 41 and the switching elements in the inverter 42 to drive the motor MG1 with the torque command Tm1* and the motor MG2 with the torque command Tm2*. Such control enables the torque demand Tr* to be output to the ring gear shaft 32a or the driveshaft for driving the hybrid vehicle 20 while operating the engine 22 efficiently without performing the EGR.

When the cooling water temperature Tw of the engine 22 is more than or equal to the first temperature Tw1 at the processing of step S120, the CPU 72 checks the value of the input EGR execution flag F (step S180). When the EGR execution flag F is value '1', the CPU 72 sets the EGR on-time operation curve Lon to the execution operation curve Lx (step S190). The CPU 72 then executes a series of the processing of step S140 through S170 using the set execution operation curve Lx and terminates the drive control routine. Such control enables the torque demand Tr* to be output to the ring gear shaft 32a or the driveshaft for driving the hybrid vehicle 20 while operating the engine 22 efficiently with the EGR performed.

Both when the cooling water temperature Tw of the engine 22 is less than the first temperature Tw1 and more than or equal to the second temperature Tw2 at the processing of step S120, and when the EGR execution flag F is value '0' at the processing of step S180 though the cooling water temperature Tw is more than the first temperature Tw1, the CPU 72 executes a series of the processing of step S140 through S170 using the execution operation curve Lx set until when this routine is performed last time.

There is a case considered where the hybrid vehicle 20 continues the drive with the accelerator pedal 83 stepped off, for example at a descent, while operating the engine with the EGR performed. The EGR-on time operation curve Lon is set to the execution operation curve Lx while the EGR is performed. During the operation of the engine 22 with the smaller torque demand Tr* and power demand Pe* according to step-off of the accelerator pedal 83, the cooling water temperature Tw becomes smaller than the first temperature Tw1 and the EGR is stopped. The cooling water temperature Tw is not less than the second temperature Tw2 at this time and the EGR-on time operation curve Lon is kept as the execution operation curve Lx, there is no occurrence of decrease in the rotation speed and increase in the torque due to switching the execution operation curve Lx though the balance between the intake air amount Qa and the exhaust recirculation amount of the engine 22 undergoes quick change due to the stop of the EGR. When the cooling water temperature Tw becomes smaller than the second temperature Tw2 afterwards, the execution operation curve Lx is switched from the EGR-on time operation curve Lon to the EGR-off time operation curve Loff. That is, hysteresis in accordance with the cooling water temperature Tw is provided to set the execution operation curve Lx for the purpose of keeping the EGR-on time operation curve Lon for a while even when the EGR is stopped. This prevents the operation state of the engine 22 from becoming unstable further due to switching the operation curve in addition to quick change of the operation state of the engine 22 according to the stop of the EGR. The second temperature Tw2 may be thus predetermined by experiment based on the characteristics of the engine 22 to be such a lower temperature than the first temperature Tw1 as not to cause frequent switching of the operation curve when shifting the EGR-on time operation curve Lon to the EGR-off time operation curve Loff.

In the hybrid vehicle 20 having the internal combustion engine system of the embodiment described above, the execution operation curve Lx is set by switching from the EGR-off time operation curve Loff to the EGR-on time operation curve Lon when the EGR is started with the cooling water temperature Tw of the engine 22 being more than or equal to the first temperature Tw1, and the execution operation curve Lx is set by switching from the EGR-on time operation curve Lon to the EGR-off time operation curve Loff when the cooling water temperature Tw becomes smaller than the second temperature Tw2 that is lower than the first temperature Tw1. Accordingly, frequent changes of the execution operation curve Lx are restricted. As a result, the operation state of the engine 22 with the EGR performed as necessary is effectively prevented from becoming unstable. Furthermore, the execution operation curve Lx is set to be the EGR-on time operation curve where the torque of the engine 22 is smaller than the torque in the EGR-off time operation curve Loff upon satisfaction of the EGR execution condition. This arrangement enables the operation state of the engine 22 with the EGR performed to be more appropriate.

In the hybrid vehicle 20 having the internal combustion engine system of the embodiment, the EGR execution flag F that is set to be value '1' while the EGR execution condition is satisfied is used. Instead of the EGR execution flag F, an EGR determination flag may be used. The EGR determination flag is set to be value '1' during satisfaction of an EGR determination condition that is a condition to determine that the EGR is performed, for example, the condition that the exhaust gas recirculation amount or the exhaust gas recirculation rate is more than a threshold value.

In the hybrid vehicle 20 having the internal combustion engine system of the embodiment, the EGR execution condition includes the condition that the cooling water temperature Tw of the engine 22 is more than or equal to the first temperature Tw1. In one modified example, the EGR execution condition may not include the condition that the cooling water temperature Tw of the engine 22.

In the hybrid vehicle 20 having the internal combustion engine system of the embodiment, the EGR-on time operation curve Lon and the EGR-off time operation curve Loff is used as the execution operation curve Lx by switching each other. The EGR-on time operation curve Lon ensures the efficient operation of the engine 22 when the EGR is performed and the EGR-off time operation curve Loff ensures the efficient operation of the engine 22 when the EGR is not performed. This is not essential. A first operation curve in place of the EGR-off time operation curve Loff and a second operation curve where the torque is smaller than the torque defined in the first operation curve in place of the EGR-on time operation curve Lon may be used as the execution operation curve Lx by switching each other regardless of whether the operation curves ensure the efficient operation of the engine 22.

Figure 7:
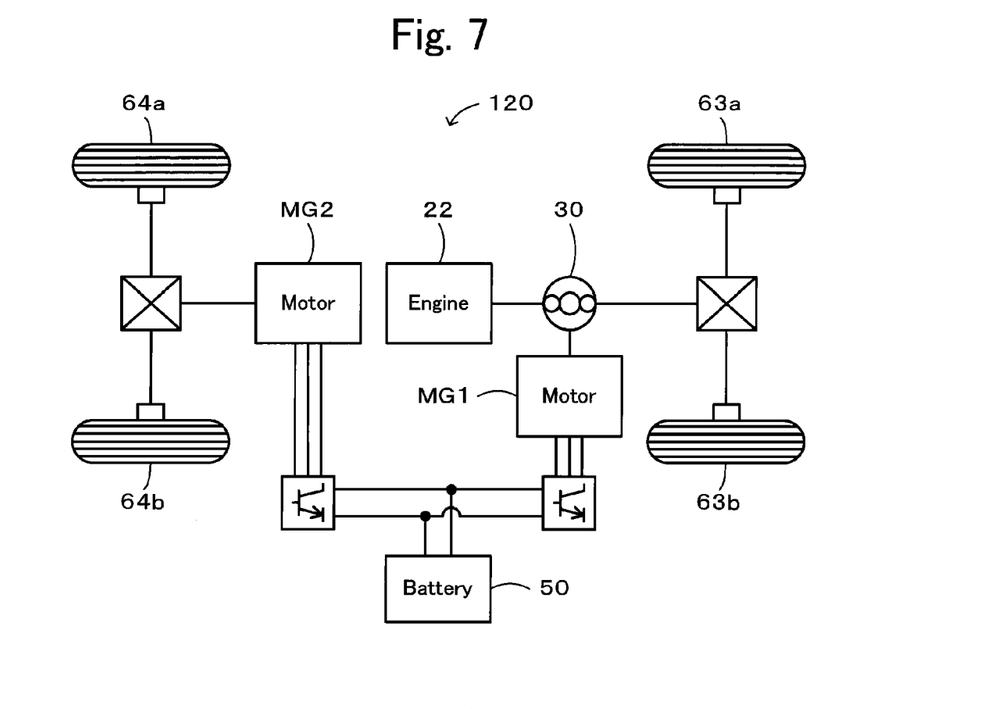
FIG. 7 schematically illustrates the configuration of another hybrid vehicle 120 in one modified example.

In the hybrid vehicle 20 having the internal combustion engine system of the embodiment, the power of the motor MG2 is converted by the reduction gear 35 and is output to the ring gear shaft 32a. The technique of the invention is also applicable to a hybrid vehicle 120 of a modified structure shown in FIG. 7. In the hybrid vehicle 120 of FIG. 7, the power of the motor MG2 is connected to another axle (an axle linked with wheels 64a and 64b) that is different from the axle connecting with the ring gear shaft 32a (the axle linked with the drive wheels 63a and 63b).

Figure 8:
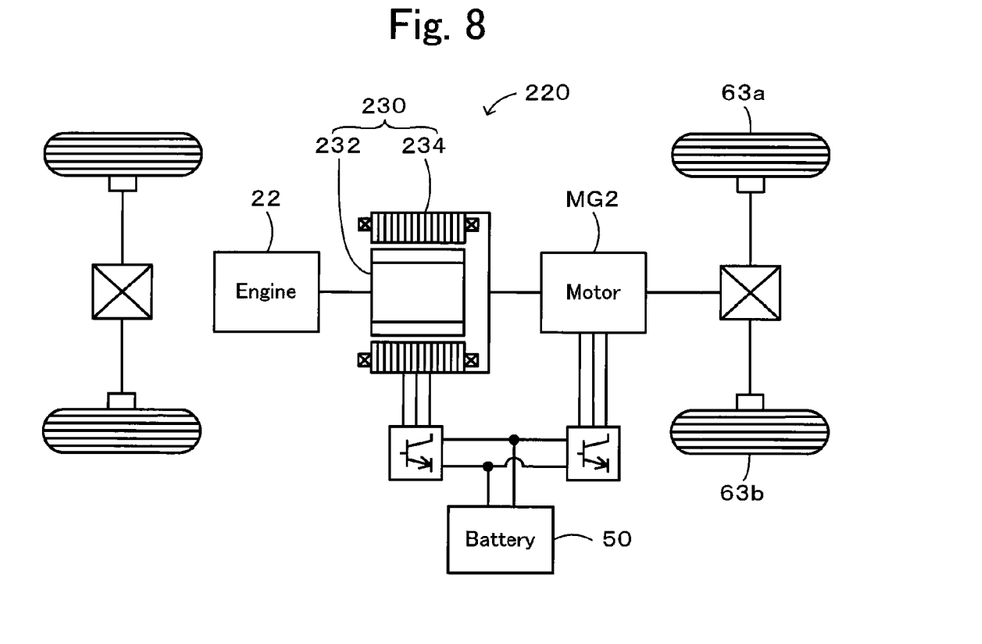
FIG. 8 schematically illustrates the configuration of still another hybrid vehicle 220 in another modified example.

In the hybrid vehicle 20 having the internal combustion engine system of the embodiment, the power of the engine 22 is output via the power distribution integration mechanism 30 to the ring gear shaft 32a or the driveshaft linked with the drive wheels 63a and 63b. The technique of the invention is also applicable to a hybrid vehicle 220 of another modified structure shown in FIG. 8. The hybrid vehicle 220 of FIG. 8 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63*a* and 63*b*. The pair-rotor motor 230 transmits part of the output power of the engine 22 to the driveshaft, while converting the residual engine output power into electric power.

The embodiment regards application of the internal combustion engine system included in the hybrid vehicle 20. The principle of the invention may be actualized by diversity of other applications, for example, an internal combustion engine system included in motor vehicles driven by transmitting power to drive wheels only from an engine or vehicles other than motor vehicles as well as a control method of such an internal combustion engine system.

The primary elements in the embodiment and its modified examples are mapped to the primary constituents in the claims of the invention as described below. The engine 22 in the embodiment corresponds to the 'internal combustion engine' in the claims of the invention. The combination of the EGR pipe 152 with the EGR valve 154 in the embodiment corresponds to the 'exhaust gas recirculation unit' in the claims of the invention. The water temperature sensor 142 that detects the cooling water temperature Tw in the embodiment corresponds to the 'temperature detector' in the claims of the invention. The hybrid electronic control unit 70 executing the processing of step S110 in the drive control routine of FIG. 3 to set the power demand Pe* of the engine 22 corresponds to the 'target power setting module' in the claims of the invention. The hybrid electronic control unit 70 executing the processing of step S120, S130, S180 and S190 in the drive control routine of FIG. 3 to set the execution operation curve Lx based on the cooling water temperature Tw and the EGR execution flag F corresponds to the 'execution relation setting module' in the claims of the invention. The combination of the hybrid electronic control unit 70 executing the processing of the step S140 and S170 in the drive control routine of FIG. 3 to set the target rotation speed Ne* and target torque Te* based on the power demand Pe* and the execution operation curve Lx and send the setting to the engine ECU 24, and the engine ECU 24 executing the EGR when the EGR execution flag F is set to value '1' and controlling the engine 22 based on the received target rotation speed Ne* and target torque Te* in the embodiment corresponds to the 'control module' in the claims of the invention. The motor MG2 in the embodiment corresponds to the 'motor' in the claims of the invention. The combination of the power distribution integration mechanism 30 and the motor MG1 in the embodiment corresponds to the 'electric power-mechanical power input output assembly' in the claims of the invention. The battery 50 in the embodiment corresponds to the 'accumulator' in the claims of the invention. The pair-rotor motor 230 in the embodiment also corresponds to the 'electric power-mechanical power input output assembly' in the claims of the invention. The 'internal combustion engine' is not restricted to the internal combustion engine designed to consume a hydrocarbon fuel, such as gasoline or light oil, and thereby output power, but may be an internal combustion engine of any other design, for example, a hydrogen engine. The 'exhaust gas recirculation unit' is not restricted to the combination of the EGR pipe 152 with the EGR valve 154 but may be any other unit that performs an exhaust gas recirculation where exhaust from the internal combustion engine is recirculated to an intake system of the internal combustion engine. The 'execution relation setting module' is not restricted to the hybrid electronic control unit 70 setting the execution operation curve Lx based on the cooling water temperature Tw and the EGR execution flag F, but may be any other arrangement of, when the exhaust gas recirculation is started by the exhaust gas recirculation unit with the detected temperature of the cooling water being more than or equal to a first temperature while a first relation between a rotation speed and a torque of the internal combustion engine is set as an execution relation, setting a second relation having a smaller torque than the torque of the internal combustion engine in the first relation as the execution relation, and when the detected temperature of the cooling water becomes smaller than a second temperature that is lower than the first temperature while the second relation is set as the execution relation, the execution relation setting module setting the first relation as the execution relation. The 'control module' is not restricted to the combination of the hybrid electronic control unit 70 with the engine ECU 24 but may be actualized by a single electronic control unit. The 'control module' is not restricted to the arrangement of executing the EGR when the EGR execution flag F is set to value '1' and controlling the engine 22 based on the target rotation speed Ne* and target torque Te* set based on the power demand Pe* and the execution operation curve Lx, but may be any other arrangement of controlling the internal combustion engine and the exhaust gas recirculation unit so that the set target power is output from the internal combustion engine according to the set execution relation with the exhaust gas recirculation performed as necessary. The 'motor' is not restricted to the motor MG2 constructed as a synchronous motor generator but may be any type of motor capable of outputting power to a driveshaft linked to an axle of the vehicle, for example, an induction motor. The 'electric power-mechanical power input output assembly' is not restricted to the combination of the power distribution integration mechanism 30 and the motor MG1 or the pair-rotor motor 230 but may be any other assembly connected with the driveshaft and with an output shaft of the internal combustion engine in such a manner as to be rotatable independently of the driveshaft and configured to input and output power to and from the driveshaft and the output shaft through input and output of electric power and mechanical power. The 'accumulator' is not restricted to the battery 50 as a secondary battery but may be a capacitor or any other storage unit configured to transmit electric power to and from the motor and the electric power-mechanical power input output assembly. The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the internal combustion engine systems.

The invention claimed is:
1. An internal combustion engine system having an internal combustion engine, the internal combustion engine system comprising:
an exhaust gas recirculation unit that performs an exhaust gas recirculation where exhaust from the internal combustion engine is recirculated to an intake system of the internal combustion engine;
a temperature detector that detects a temperature of cooling water of the internal combustion engine;

a target power setting module that sets a target power to be output from the internal combustion engine;

an execution relation setting module that, when the exhaust gas recirculation is started by the exhaust gas recirculation unit with the detected temperature of the cooling water being more than or equal to a first temperature while a first relation between a rotation speed and a torque of the internal combustion engine is set as an execution relation, sets a second relation having a smaller torque than the torque of the internal combustion engine in the first relation as the execution relation;

when the detected temperature of the cooling water being more than or equal to the second temperature that is smaller than the first temperature while the second relation is set as the execution relation, holds the second relation as the execution relation, and when the detected temperature of the cooling water becomes smaller than the second temperature while the second relation is set as the execution relation, the execution relation setting module sets the first relation as the execution relation; and a control module that controls the internal combustion engine and the exhaust gas recirculation unit so that the set target power is output from the internal combustion engine according to the set execution relation with the exhaust gas recirculation performed as necessary.

2. The internal combustion engine system in accordance with claim 1, wherein the first relation is a relation of the rotation speed and the torque of the internal combustion engine that is efficiently operated when the exhaust gas recirculation is not performed by the exhaust gas recirculation unit and the second relation is a relation of the rotation speed and the torque of the internal combustion engine that is efficiently operated when the exhaust gas recirculation is performed by the exhaust gas recirculation unit.

3. The internal combustion engine system in accordance with claim 1, wherein the control module is programmed to control the exhaust gas recirculation unit so that the exhaust gas recirculation is performed upon satisfaction of an exhaust gas recirculation condition that includes a condition that the detected temperature of the cooling water is more than or equal to the first temperature.

4. A vehicle having the internal combustion engine system in accordance with claim 1, wherein the target power setting module is programmed to set the target power based on a driving power demand for driving the vehicle.

5. The vehicle in accordance with claim 4, the vehicle further having:

a motor capable of outputting power to a driveshaft linked to an axle of the vehicle;

an electric power-mechanical power input output assembly connected with the driveshaft and with an output shaft of the internal combustion engine in such a manner as to be rotatable independently of the driveshaft and configured to input and output power to and from the driveshaft and the output shaft through input and output of electric power and mechanical power; and an accumulator configured to transmit electric power to and from the motor and the electric power-mechanical power input output assembly.

6. A control method of an internal combustion engine system having an internal combustion engine and an exhaust gas recirculation unit that performs an exhaust gas recirculation where exhaust from the internal combustion engine is recirculated to an intake system of the internal combustion engine, the control method comprising:

when the exhaust gas recirculation is started by the exhaust gas recirculation unit with a temperature of cooling water of the internal combustion engine being more than or equal to a first temperature while a first relation between a rotation speed and a torque of the internal combustion engine is set as an execution relation, setting a second relation having a smaller torque than the torque of the internal combustion engine in the first relation as the execution relation;

when the detected temperature of the cooling water of the internal combustion engine is more than or equal to the second temperature that is smaller than the first temperature while the second relation is set as the execution relation, holds the second relation as the execution relation and when the detected temperature of the cooling water of the internal combustion engine becomes smaller than the second temperature while the second relation is set as the execution relation, the execution relation setting module sets the first relation as the execution relation, and controlling the internal combustion engine and the exhaust gas recirculation unit so that a target power to be output from the internal combustion engine is output from the internal combustion engine according to the set execution relation with the exhaust gas recirculation performed as necessary.

* * * * *